United States Patent
Smilansky et al.

(10) Patent No.: US 6,323,856 B1
(45) Date of Patent: Nov. 27, 2001

(54) METHOD FOR PROCESSING VARIABLE SPEED SCENES FOR COMPUTER GAMES

(75) Inventors: Zeev Smilansky, Meishar; Orna Bregman-Amitai, Tel Aviv, both of (IL)

(73) Assignee: Shmuel Banitt, Beit Yanai (IL)

( * ) Notice: Subject to any disclaimer, the term of this patent is extended or adjusted under 35 U.S.C. 154(b) by 0 days.

(21) Appl. No.: 09/270,924

(22) Filed: Mar. 16, 1999

(30) Foreign Application Priority Data

Mar. 19, 1998 (IL) .......................................... 123738

(51) Int. Cl.[7] .................................................... G06T 17/00
(52) U.S. Cl. ............................................................ 345/418
(58) Field of Search .................................... 345/418, 419, 345/473, 474, 433, 434, 439, 435, 426, 427

(56) References Cited

U.S. PATENT DOCUMENTS

| | | | |
|---|---|---|---|
| 4,668,986 | | 5/1987 | Furukawa . |
| 5,557,684 | | 9/1996 | Wang et al. . |
| 5,969,722 | * | 10/1999 | Palm ..................................... 345/418 |
| 6,016,150 | * | 1/2000 | Lengyel et al. ....................... 345/418 |
| 6,229,550 | * | 5/2001 | Gloudemans et al. ................ 345/418 |
| 6,243,103 | * | 6/2001 | Takiguchi et al. .................... 345/418 |

* cited by examiner

*Primary Examiner*—Cliff N. Vo
(74) *Attorney, Agent, or Firm*—Akin, Gump, Strauss, Hauer & Feld, L.L.P.

(57) ABSTRACT

Method for the interactive real time processing and displaying of camera shots or computer generated video image sequences that include moving objects of variable speed for generating improved computer games. A bank of original sequences of individually selectable images is generated. Each sequence is shot by a camera and contains moving objects and converted to a digital form. A range of possible modified object speeds are selected for each computer game. A set of transformations, from each frame of the original sequence, to its next frame, is calculated in advance for all frames, and stored in a memory, together with the original digital sequence, as a data-base file. Any desired manipulation of the image of a frame on the stored transformation is calculated in real-time, as a function of the desired speed provided by a player and a new virtual frame, which is an intermediate frame of frames from the original sequence is generated in real-time, according to the calculation results. The new generated frame is displayed means, and any other required intermediate frame is generated and displayed, in real-time, optionally together with selected frames from the original sequence.

17 Claims, 5 Drawing Sheets

METHOD FOR PROCESSING VARIABLE SPEED SCENES FOR COMPUTER GAMES

BACKGROUND OF THE INVENTION

The present invention relates to the field of image processing. More particularly, the invention relates to a method for processing camera shot films and for generating therefrom improved computer games which include variable speed, selected by the player.

Computer games are widespread nowadays. They typically employ animation or Computer Generated Images (CGI) techniques, in which images are generated according to algorithms that are relatively simple to formulate, with respect to their mathematical aspects. This relative simplicity, enables CGI based computer games to have high level of interaction. On the other hand, CGI graphic quality is substantially degraded concerning the experience felt by the player, comparing to video graphic quality.

Although video stream graphic techniques have superior quality, they lack interaction. Their graphic representation must track the video camera path, each time the game is played, turning the game into a non-attractive one. In addition, the mathematical representation of a video stream is very complicated and thus, practical almost impossible.

The technology employed in the art for video image processing suffers from several drawbacks, the most important of which being: 1) that there is only a limited feeling of reality, since scenes are pre-determined, constrained to the path, plot and events that were shot and recorded by the video camera; 2) data rates required for display of video streams are very high (in a typical β video stream, 25 frames are displayed at each second, each frame is represented by 0.8 Mbyte, resulting in data rate of 20 Mbyte/Sec); 3) those scenes that appear near an interactive event give the feeling of discontinuity; 4) the range of intermediate speed values is limited. Thus, there are speed values that can not be reached using prior art methods; and 5) more importantly, interactive processing of video streams can not be carried out by conventional Personal Computers (PCs), to give satisfactory results.

Interaction of games may be improved substantially by manipulating the speed of video streams related to the game. One known method is based on changes in the frame display rate of the stream, by dropping frames from the original sequence (usually used for acceleration) or by inserting new frames which may be duplicates of some original frames. This method is widely used for converting video films from PAL (European standard for color TV) to NTSC (American standard for color TV) format, and vice versa. However, since the human eye is sensitive to irregular motion, poor results were achieved using this method concerning the feeling of continuity. In addition, speed values are pre-determined and can not be changed in real time.

U.S. Pat. No. 4,668,986 to Furukawa discloses a method for motion-adaptive interpolation of video signals. A number of motion vectors are computed for each moving object, generating a new representative motion vector.

U.S. Pat. No. 5,557,684 to Wang et. al describes a system for compressing image data for transmission by encoding the data into multiple layers. The system stores images as a series of layers determining the boundaries of regions of coherent motion over the frame, together with associated motion parameters. These motion parameters are coefficients of motion equations that describe the transformations between successive frames by formulating a motion model for each region within a frame. Each image is segmented into regions of coherent motion and defines associated layers of intensity, motion parameters, and depth.

U.S. Pat. No. 5,565,920 to Jungwoo et al. describes a method for video data compression using adaptive motion interpolation. Temporal segmentation is used to dynamically adapt motion interpolation structures for video compression.

Notwithstanding the very high commercial importance of sophisticated computer games, and the many efforts put into the manufacturing of games in the computer industry, the art has so far not successfully addressed the severe problem of producing interactive computer video games, based on real life images. It is an object of the invention to provide a method for manufacturing interactive computer games of improved quality, using real life shots.

It is an object of the invention to provide such interactive games in which the speed of displayed video streams is manipulated interactively to run slower and faster.

It is an object of the present invention to provide a method for real time computation and generation of virtual frames displayed as image sequences, which overcomes the drawbacks of the prior art.

It is another purpose of the invention to provide computer games utilizing pre-shot image sequences, which permit to effect smooth speed changes without the need for large databases of pre-stored images.

It is another object of the present invention to provide a method for carrying out and for storing most of the required intensive processing, in advance, while the display of any desired speed is carried out, in real time, using a fast, simple computation.

Other purposes and advantages of the invention will appear as the description proceeds.

SUMMARY OF THE INVENTION

The invention is directed to a method for the interactive real time processing and displaying of camera shots or computer generated video image sequences that include moving objects of variable speed, particularly for generating improved computer games, comprising the steps of:

(a) Providing at least one bank containing an original sequence of individually selectable images, said bank of images being shot by a movie or the like camera, and containing at least one object moving at least at one speed;

(b) Converting the said camera shot sequence to a digital form;

(c) For each computer game, selecting a range of possible modified speeds for objects moving in said sequence;

(d) Calculating in advance, for all frames, the transformation from each frame of said original sequence of step b) above to its next frame;

(e) Storing the original digital sequence of step (b) above and the set of transformations of step (c) above as a data-base file in suitable memory means;

(f) Calculating in real time any desired manipulation of the image of a frame, or of the part thereof, on the stored transformation of step (e) above, as a function of the desired speed provided by a player;

(g) Generating in real time a new virtual frame which is an intermediate frame of at least two frames from the original sequence of step (b)above, according to the results of the calculations of step (f) above;

(h) Displaying the new generated frame on suitable display means; and (i) Generating and displaying, in real time any other required intermediate frame, optionally together with selected frames from the original sequence.

By "object" it is meant to indicate a group of pixels which are part of the image and differs from other parts by a defined classification (e.g., color motion or arbitrary criteria). Group of objects may also be defined as an object. Depth layers with significant differences of distance from camera may be defined as objects (e.g., far background).

By "moving object" it is meant to indicate an object which appears differently in two (or more) adjacent frames, like as a result of camera movements, or even without changing its relative position, e.g., an object that only changes its color.

By "speed" it is meant to indicate the rate of changes of an object characteristics from one frame to another frame, e.g., changes in its relative position with respect to other objects, shape, colors, camera movements etc. Thus, speed may be varied even without any physical displacement of the object itself.

The original sequence of images can be either filmed with a camera, which may be a movie camera, a video camera, or any other suitable type of camera, or can be computer generated. Furthermore, the original sequence of images can be a combination of computer generated and film camera shot frames, transformed to digital form.

As will be apparent to the skilled person from the description to follow, according to a preferred embodiment of the invention the original sequence is used as the reference sequence.

The object speed changes and their resolution can be derived from a variety of events, for instance, from a previous occurrence during the game. According to a preferred embodiment of the invention, however, values for such changes, as well as their rates are provided interactively by the player and input thereby. This can be done, i.e., through the movement of a joystick, or by selecting a suitable button, or by directly inputting a value.

As will be apparent to the skilled person, the displaying of the images, their creation and interpolation, and the storage of the information used to generate them, all require computational power and memory means. These can be provided by any suitable computing means, such as commercially available computers, e.g., a Personal Computer (PC), or may be carried out by a specially designed computer, as is often done with arcade games.

As stated, each sequence may contain one or more objects that may move independently one of the other. According to a preferred embodiment of the invention, the speed of each one of a plurality of independently moving objects is controlled independently.

According to a preferred embodiment of the invention, more than one sequence are speed processed and displayed simultaneously. According to another preferred embodiments of the invention, different sequences originate from different scenes and/or are of different lengths.

Any change in speed can be effected, according to the invention. Thus, the speed can be reduced or accelerated, or the movement can be stopped, or the direction of movement can be inverted. Furthermore, movement can be either horizontal, or vertical, or composite.

According to a preferred embodiment of the invention, additional sequences are computer generated virtual object sequences. Several types of transformations can be used. Illustrative and non-limitative examples of such transformations include shift transformations, rigid transformations, projective transformations, object oriented pixel dependent transformations, area oriented pixel dependent transformations, and transformations carried out as a result of camera movements.

BRIEF DESCRIPTION OF THE SEVERAL VEIWS OF THE DRAWINGS

The above and other characteristics and advantages of the invention will be better understood through the following illustrative and non-imitative detailed description of preferred embodiments thereof, with reference to the appended drawings, wherein.

DETAILED DESCRIPTION OF THE EMBODIMENTS

In order to create an interactive continuous realistic computer game, it is needed to provide means for controlling the speed of moving objects. A scene with a moving object can be displayed to the player by a sequence of images. Each image shows a different location of the moving object with respect to the background of the scene. The said images, when displayed consecutively, give the observer the feeling of movement at a given speed. Changing speed is being achieved by changing several parameters, as will be explained below.

Figure 1A:
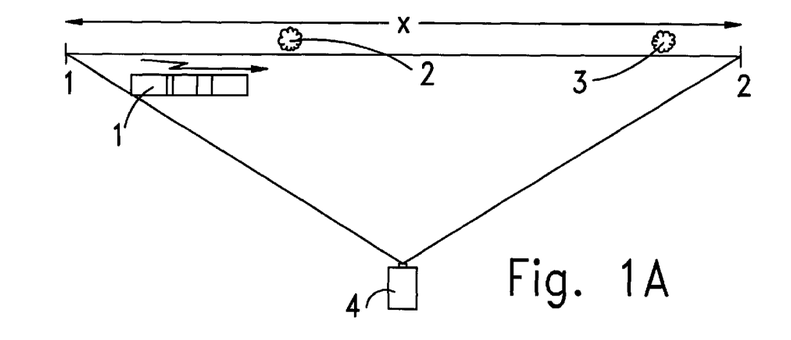
FIGS. 1A to 1D schematically illustrate the relative locations in a scene with a moving object while being shot by a camera.

For a better understanding of speed effects seen by a player, there is a need first to define some parameters which directly affect the object speed while displaying a scene. FIG. 1A illustrates a scene which takes place along a road segment of length×[m]. A moving object which in this case is a car 1, is being shot by a camera 4, which operates with a shooting rate of $N_0$ [frames/Sec]. For simplicity, it is assumed that camera 4 is located at a fixed position during all the shot. Moreover, it is assumed that car 1 moves from left to right at a fixed velocity $V_0$. The car enters the scene at point 1, passes in front of tree 2 and then tree 3, and disappears at point 2. In this case the total scene time will be $T_0$ [Sec] where:

$$T_0 = /V_0$$

Since the shooting rate is $N_0$, the total number of frames for the scene will be $S_0$, where $S_0 = N_0 * T_0$. This means that this scene can be displayed by a sequence length of $S_0$ frames (or images).

Figure 1B:
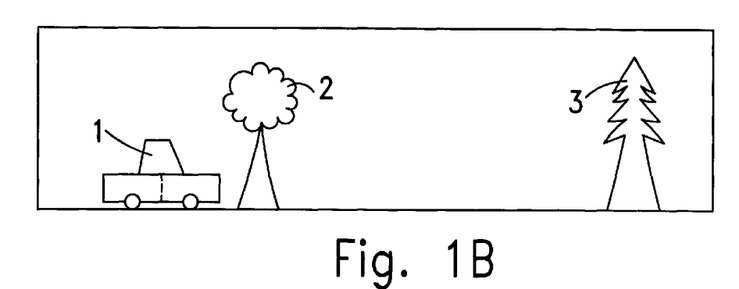
Figure 1C:
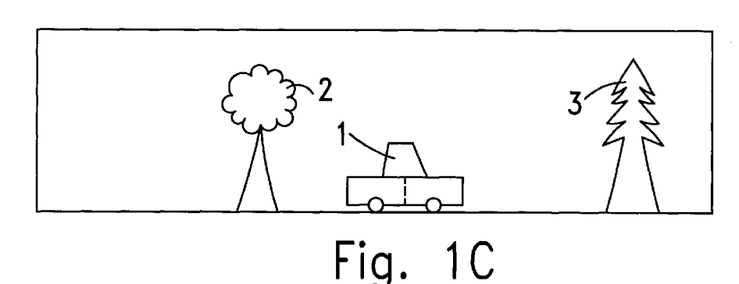
Figure 1D:
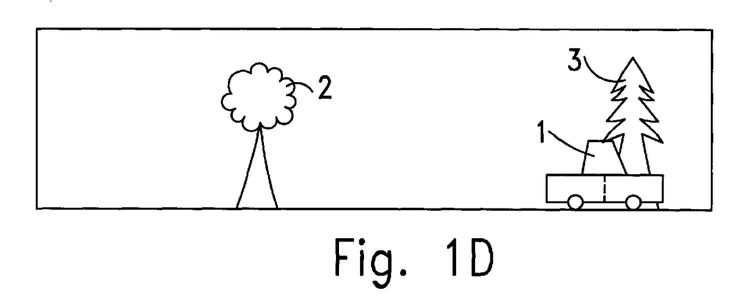

FIGS. 1B, 1C and 1D show 3 frames which are a part of the sequence $S_0$. It can be seen that in FIG. 1B the car 1 has almost reached tree 2, in FIG. 1C it is between tree 2 and tree 3 and in FIG. 1D it is right in front of tree 3. If those three frames are displayed consequently, the observer will see the car moving from left to right. If all $S_0$ frames will be displayed to the observer in exactly the same rate $N_0$, then the observer will see the car moving at exactly the same speed $V_0$ at which the car moved when the original sequence was shot.

On the other hand, if the observer wishes to see exactly the same scene with car 1 moving at a speed other than $V_0$, then it is clear that if he wishes to accelerate, then the scene should be displayed faster, viz. during a time shorter than $T_0$. If he wishes to reduce the speed, then the display time should be larger than $N_0$.

Another effect to be taken into account when changing the speed of an object, is the resolution of the displayed scene. Looking at FIG. 2A which illustrates this problem, an original sequence of frames is seen, taken by a camera with rate $N_0=1$ [frame/Sec] during a scene with a car moving at speed $V_0=1$ [m/Sec] and traveling a distance of x=8 [m]. The total scene time is $T_0=8$ [Sec], and the total number of frames is $S_0=8$, indicated as A1 to A8 in the figure. As it can be seen, each frame, starting from left to right, contains different information about the relative location of the car in the scene showing its movement from left to right in increments.

Figure 2A:
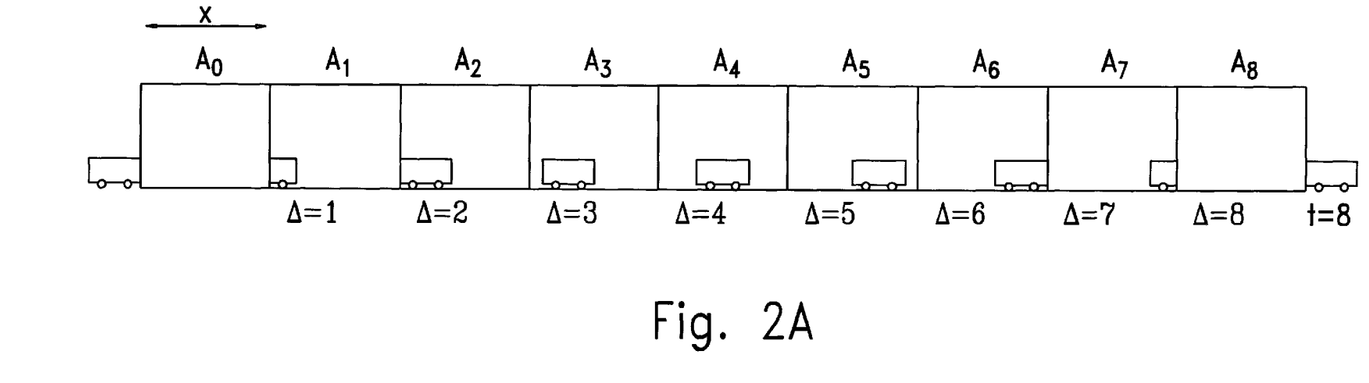
FIGS. 2A to 2B schematically illustrate a an original sequence and a processed sequence containing low speed moving object.

According to what was discussed above, if the original shot included 8 frames, then if they are displayed during 8 seconds, the observer will see the car moving at a speed of 1 [m/Sec] from left to right.

Now, if the observer wishes to watch the same scene with the car moving slower e.g., to reduce the speed to $0.27*V_0$, then the scene should be displayed during 29.6 seconds (=8/0.27). In this case, if the same display rate of 1 [frame/Sec] is kept, then in order to keep the same quality of the original scene 30 frames must be displayed, otherwise unwanted "stops" in the car movement will appear. Thus, in this case it is needed to generate a new set of 30 (=the first integer number that>29.6) intermediate frames. Each frame from the said new set displays a non-existing (in the original sequence) relative position of the moving object (a car in this example). Looking at the original sequence frames of FIG. 2A from left to right, each frame represents a shift of distance $\Delta$ of the car position, relative to its previous frame.

Figure 2B:
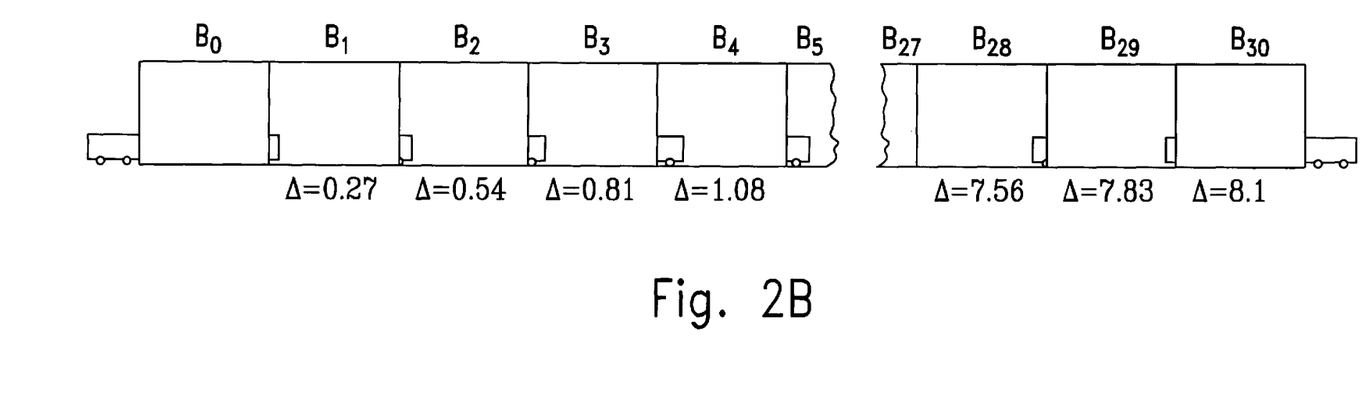

Looking at FIG. 2B, it can be seen that since the car speed was cut to $0.27*V_0$, a new desired sequence B1 to B30 was generated. Indicating each frame by its relative displacement of the moving object (a car in this case), each frame can be generated according to the following process (in terms of the distance shift $\Delta$:

$$B0=A0$$

$$B1=B0+0.27*\Delta$$

$$B2=B1+0.27*\Delta=B0+0.54*\Delta$$

$$B3=B2+0.27*\Delta=B0+0.81*\Delta$$

.

.

.

$$B30=B29+0.27*\Delta=B0+8.1*\Delta$$

It is clear that all the frames B1 . . . B30 are newly generated and none of them is identical to a frame from the original sequence. Furthermore, if frames from the original sequence are duplicated and displayed in order to have the impression of reduced speed, the car may be seen moving with "jump" rather than performing a continuous and smooth ride, resulting in a bad quality film.

Of course, varying the car speed $V_0$ by other factors will require different combinations of frames and further processing than was shown in FIG. 2 above. FIG. 2 showed only part of the effects that can be achieved by image processing.

The invention uses one original sequence taken by a camera or generated by a computer, displaying a moving object moving in a given speed or displaying relative shift in objects position according to horizontal and/or vertical movements of the camera.

Since one goal of the invention is to minimize the amount of real-time processing needed to obtain satisfactory results, when complex transformations are required, the invention is based on a method of using a pre-programmed data-base together with said original sequence. One important advantage of using one original sequence and a data base is the ability to generate and display any desired frame in real time. Using the method of the invention further eliminates the need for a very large and memory-consuming bank of images.

An apparatus, for generating a speed controlled, smooth, realistic sequence in real time according to one embodiment of the invention performs the following steps:

a) Provides an original sequence which may be a video camera shot;

b) Converts each frame of said original sequence to digital form;

c) Defines groups of pixels and/or depth layers as objects;

d) Calculates a set of transformations from each frame to its next. If the original sequence comprises N frames, and i (i=1,2, . . . , N) represents the index of an original frame, then each transformation $T_i \rightarrow_{i+1}$ is being calculated;

e) Stores all the transformations $T_i \rightarrow_{i+1}$ together with the digitized original sequence in a data-base file. This original sequence will be used later to generate, together with calculated transformation from the data-base, any frame or sequence of frames that will be able to display an object moving in speed equal to or different from its speed in the original sequence;

f) Calculates, in real time any manipulation of the original frames, representing a required frame that does not exist in the data-base file. By using the term "manipulation" it is meant to describe a new transformation which is a relatively simple modification of one of the existing transformations stored in the data-base. If x represents a desired non-integer index of an intermediate frame $F_x$, and n represents the closest integer value of x, then for x>n the desired manipulation is carried out as follows:

$$F_x=[(x-n)*(T_n \rightarrow_{n+1})]\{F_n\}$$

for X>n
x<n the inverse manipulation is carried out:

$$F_x=[(n-x)*(T_{n-1} \rightarrow_n)]\{F_n\}$$

for x<n
By using the term "closest integer value" of x it is meant that $$|n-x| \leq 0.5$$

g) Displays the frame $F_x$ using suitable display means;

h) Repeats steps f) and g) above for other values of x;

By using the term "transformation", it is meant to describe two kinds of transformations. The first one is called "Global Transformation", T(x,y) when the same transforming process is being applied on a whole frame.

However, in some cases a transformation is applied only on one or more objects of the frame. Thus, if there are m objects to be transformed in a frame, the second transformation is a actually a set of transformations called "Object Dependent Transformation" $T=T_j(x,y)$ where j=0,1, . . . , m. Moreover, several kinds of transformations may be operated: simple shifting, projective transformation, different transformation for different areas, etc.

In some cases, better and smooth results will be achieved using complex transformations during the game display. In other cases, the same results may be achieved by relatively simple transformations.

Transformations are related to their relative quality. Since a digital image (frame) is constructed from a matrix of pixels, a transformation $Tn_n \rightarrow$ from one frame to the next frame not necessarily requires implementation on each pixel of the frame. In some cases, implementation of the transformation is carried out partially, according to the required quality. A transformation $T_n \rightarrow_{n+1}$ may be implemented on frame n so as to obtain frame n+1 to look substantially the same as the original frame n+1 to the eye of a moderate observer. This may simplify the required processing and still achieve satisfactory results.

According to another preferred embodiment of the present invention an apparatus provides multiple video sequences that are speed controlled independently, forming a scene. Each video sequence may be of different length, and may include only part of the displayed scene. The apparatus performs the following steps:

i) Provides multiple original sequence which may be a video camera shots;

j) Converts each frame of said multiple original sequences to digital form;

k) For each original sequence, calculates a set of transformations from each frame to its next, in the same way as described in step f) above;

l) Stores all the transformations $T_i \rightarrow T_{i+1}$ of each sequence of said multiple sequences, together with the digitized original multiple sequences in a data-base file;

m) Defines a range of possible manipulations relating to speed differences between different sequences. This range may be frame dependent and/or scene dependent. For instance, if two different sequences include connected moving objects or connected static objects, both sequences should be displayed in the same speed. In another case, one sequence may include a far background view, wile another sequence includes a rigid moving object, a car for example. It is possible to run the car and the far background view in different speeds. On the other hand, instead of the car the other sequence may include a flexible moving object, a walking person for example. In this case, the two different sequences may be displayed in only slightly different speeds;

n) Calculates, in real time, for each sequence from the multiple set of sequences, any manipulation of its original frames, representing a required frame that does not exist in the data-base file in the same process described in step f) above;

o) Displays simultaneously all the multiple sequences as different layers in a pre-determined order, forming a complete scene;

According to still another preferred embodiment of the present invention an apparatus provides a video sequence several objects are speed controlled independently. The apparatus performs the following steps:

p) Provides an original sequence which may be a video camera shot;

q) Converts each frame of said original sequence to digital form;

r) Creates a set of "object sequences" which are virtual sequences, each containing one object, comprising the following steps:
 (1) Location of the first frame containing at least a part of the object;
 (2) Formulation of its contour as a polygon;
 (3) Identification of the object in the next frame;
 (4) Formulation of its contour as another polygon;
 (5) Repetition of steps (3) and (4) until the object disappears;

s) Repetition of steps i) to o) above.

An object stream contains information only about one object. The remaining part of the original sequence which does not contain any object is defined and handled also as an object stream.

If multiple manipulations are required to display one frame, they should be carried out starting from the most distant object. In a case when pixels of two objects should appear in the same location on the frame, the closest object will overlie the far one. By using the term "pixel" it is meant to represent the smallest unit of a video display which may be coded to an electrical signal for transmission.

In a case when a pixel or an array of pixels has no defined source in the transformation, a "hole" may appear in the frame. For example, in case when a global transformation from one frame to its next is a simple shift by 10 pixels to the left, and it is required to generate the 0.4 portion of the frame, a shift of 4 pixels to the left should be accomplished. Thus, a strip of 4 columns on the right side will remain with no source information.

Another case, when a relative movement between two objects in a frame may also result as a hole in a desired intermediate frame, is illustrated in the following example:

A frame having two objects in two different depth layers, for instance, a house and a chain of mountains in the horizon. A simulation of camera movement to the left requires translation of the house of 15 pixels to the right, with no translation of the far background (mountains in the horizon). Generating 0.7 portion of the frame requires a shift of 4.5 [=(1−0.7)*15] pixels to the left, leaving a strip of 4.5 pixels with no source information.

To overcome these problems it is required to reach the missing information from n which is defined now as the $2^{nd}$ closest integer value of x. this means looking after the missing source information at the next frame By using the term "$2^{nd}$ closest integer value" of x it is meant that $0.5 < |n-x| \leq 1$. Similar to step e) above, if x represents a desired non-integer index of an intermediate frame $F_x$, and n represents the $2^{nd}$ closest integer value of x, then for x>n the desired manipulation is carried out as follows:

$$F_x = [(x-n)*(T_n \rightarrow_{n+1})]\{F_n\}$$

for x>n

For x<n the inverse manipulation is carried out:

$$F_x = [(n-x)*(T_{n-1} \rightarrow_n)]\{F_n\}$$

for x<n the inverse manipulation is carried out:

In some cases the missing source information exists at the $m^{th}$ frame. In this case $|m-x|>1$ and n is defined as the "integer value" of x (e.g., the integer value of 2.99 is 2). Different from step e) above, if x represents a desired non-integer index of an intermediate frame $F_x$, and n represents the integer value of x, then for x>m the desired manipulation is carried out as follows:

$$F_x = [(x-n)*(T_n \rightarrow_{n-1})*(T_{n-1} \rightarrow_{n-2})* \ldots *(T_{m+2} \rightarrow_{m+1})* (T_{m+1} \rightarrow m)]\{F_n\}$$

for x > m

For x<m and n=(integer value of x)+1, the inverse manipulation is carried out:

$$F_x = [(n-x)*(T_m \to_{m-1})*(T_{m-1} \to_{m-2})* \ldots *(T_{n+1} \to_{n+2})*$$
$$(T_n \to_{n+1})]\{F_n\}$$
for $x < m$ As an illustrative example, if x=1.1 and the source information of an object exists in frame 25, the frame transformation from 1 to 25 should be: 1→2→3→. . . →25 since there is no direct transformation 1→25.

EXAMPLE 1

Figure 3:
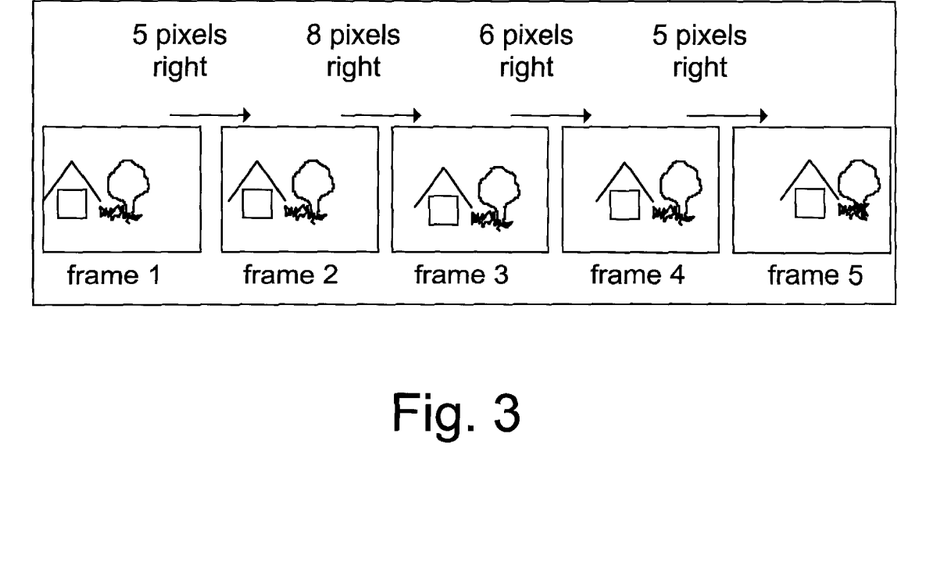
FIG. 3 illustrates a transformation process simulating movement of the camera from right to left.

FIG. 3 illustrates an apparatus for generating any desired intermediate frame from an original sequence of five frames describing a camera movement from right to the left. Similar transformations and processing is being used for speed change.

Four global transformations are needed to move from frame 1 to frame 5:

| | |
|---|---|
| $T_1 \to {}_2 \Rightarrow$ | shift by 5 pixels to the right |
| $T_2 \to {}_3 \Rightarrow$ | shift by 8 pixels to the right |
| $T_3 \to {}_4 \Rightarrow$ | shift by 6 pixels to the right |
| $T_4 \to {}_5 \Rightarrow$ | shift by 5 pixels to the right |

If the original sequence was shot at a speed of $V_0$ and a new speed of $0.8*V_0$ is desired, 6 frames should be generated from the sequence $F_1 \ldots F_5$ as follows:

| Frame No. | Source | Manipulation |
|---|---|---|
| $F_1$ | $F_1$ | none |
| $F_{1.8}$ | $F_2$ | (2−1.8)*5 = 1 pixel left |
| $F_{2.6}$ | $F_3$ | (3−2.6)*8 = 3.2 pixels left |
| $F_{3.4}$ | $F_3$ | (3.4−3)*6 = 2.4 pixels right |
| $F_{4.2}$ | $F_4$ | (4.2−4)*5 = 1 pixel right |
| $F_1$ | $F_1$ | none |

If the original sequence was shot at a speed of $V_0$ and a new speed of $1.3*V_0$ is desired, 4 frames should be generated from the sequence $F_1 \ldots F_5$ as follows:

| Frame No. | Source | Manipulation |
|---|---|---|
| $F_1$ | $F_1$ | none |
| $F_{2.3}$ | $F_2$ | (2.3−2)*8 = 2.4 pixels right |
| $F_{3.6}$ | $F_4$ | (4−3.6)*6 = 2.4 pixels left |
| $F_{4.9}$ | $F_5$ | (5−4.9)*5 = 2.4 pixels left |

EXAMPLE 2

Figure 4A:
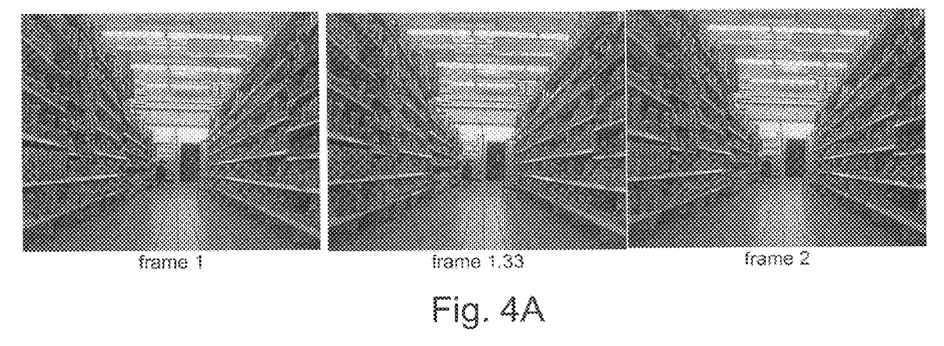
FIGS. 4A to 4B show two different intermediate frames generated from two adjacent real life shot frames.
Figure 4B:
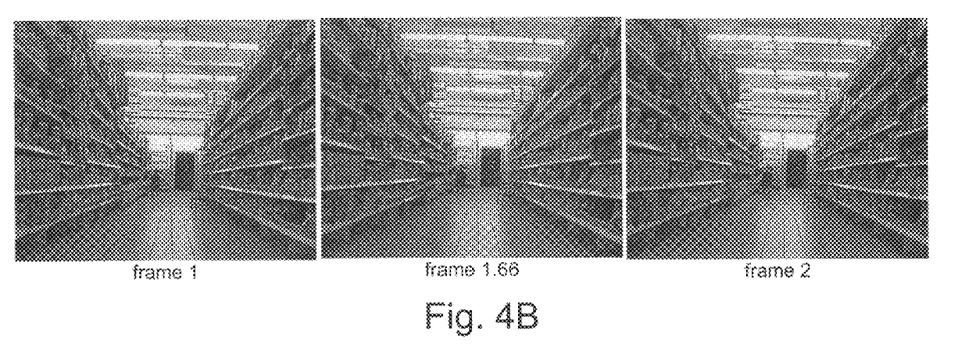

FIG. 4A and FIG. 4B show two intermediate frames, 1.33 and 1.66, respectively, generated from two adjacent original real life frames. Looking first at FIG. 5A, two real life shot frames, (loaded shelves in a department store) frame 1 and frame 2 are presented, together with an intermediate frame 1.33. Frame 2 represents a movement of the camera from right to left relative to frame 1. If $X_i$ and $Y_i$ represents the horizontal and vertical displacements (relative to the origin) of a pixel in frame i, respectively, then the transformation $T_1 \to_2$ from frame 1 to frame 2 is given by:

$$X_1 = X_2 * 1.02264 + Y_2 * 0.0058839 - 10.2872$$

$$Y_1 = X_2 * 0.00090887 + X_2 * 1.01873 - 7.9236$$

or alternatively:

$$X_2 = X_1 * 0.97798 - Y_1 * 0.00579279 + 10.0138$$

$$Y_2 = -X_1 * 0.000872476 + Y_1 * 0.981622 + 7.9236$$

Manipulating the transformation $T_1 \to_2$, a desired intermediate frame 1.33 is obtained and given by the transformation:

$$X_{1.33} = X_1 * 0.99992662 - Y_1 * 0.00190993 + 3.33795$$

$$Y_{1.33} = -X_1 * 0.000290819 + Y_1 * 0.993906 + 2.64122$$

FIG. 4B shows the same real life shot frame 1 and frame 2, together with another desired intermediate frame 1.66.

Similarly, manipulating the transformation $T_1 \to_2$, intermediate frame 1.66 is obtained and given by the transformation:

$$X_{1.66} = X_2 * 1.00741 + Y_2 * 0.00192024 - 3.36774$$

$$Y_{1.66} = X_2 * 0.000294772 + X_2 * 1.00613 - 2.6584$$

Of course, the above examples and description has been provided only for the purpose of illustrations, and are not intended to limit the invention in any way. As will be appreciated by the skilled person, the invention can be carried out in a great variety of ways, employing more than one technique from those described above, generating the original sequence by a computer or by any other photographing means, applying the same or similar method of the invention to generate on-line and real time scenes which may include more than one moving object moving in any direction, all without exceeding the scope of the invention.

What is claimed is:

1. A method for the interactive real time processing and displaying of camera shots or computer generated video image sequences that include moving objects of variable speed, particularly for generating improved computer games, comprising the steps of:

(a) Providing at least one bank containing an original sequence of individually selectable images, said bank of images being shot by a movie or the like camera, and containing at least one object moving at least at one speed;

(b) Converting the said camera shot sequence to a digital form;

(c) For each computer game, selecting a range of possible modified speeds for objects moving in said sequence;

(d) Calculating in advance, for all frames, the transformation from each frame of said original sequence of step (b) above to its next frame;

(e) Storing the original digital sequence of step (b) above and the set of transformations of step (c) above as a data-base file in suitable memory means;

(f) Calculating in real time any desired manipulation of the image of a frame, or of the part thereof, on the stored transformation of step (e) above, as a function of the desired speed provided by a player;

(g) Generating in real time a new virtual frame which is an intermediate frame of at least two frames from the original sequence of step (b) above, according to the results of the calculations of step (f) above;

(h) Displaying the new generated frame on suitable display means; and (i) Generating and displaying, in real time any other required intermediate frame, optionally together with selected frames from the original sequence.

2. A method according to claim 1, wherein the original sequence of images is computer generated.

3. A method according to claim 1, wherein the original sequence of images is a combination of computer generated and film camera shot frames transformed to digital form.

4. A method according to claim 3, wherein the movie camera is a video camera.

5. A method according to claim 1, wherein the object speed changes and the rate of change is provided interactively by the player and input thereby.

6. A method according to claim 1, wherein the image processing and the calculations are carried out on a Personal Computer (PC).

7. A method according to claim 1, wherein the speed of each one of a plurality of independently moving objects is controlled independently.

8. A method according to claim 1, wherein more than one sequence are speed processed and displayed simultaneously.

9. A method according to claim 8, wherein different sequences originate from different scenes and/or are of different lengths.

10. A method according to claim 1, wherein the speed is reduced or accelerated, or movement is stopped, or the direction of movement is inverted.

11. A method according to claim 1 wherein additional sequences are computer generated virtual object sequences.

12. A method according to claim 1, wherein the transformations are shift transformations.

13. A method according to claim 1, wherein the transformations are rigid transformations.

14. A method according to claim 1, wherein the transformations are projective transformations.

15. A method according to claim 1, wherein the transformations are object oriented pixel dependent transformations.

16. A method according to claim 1, wherein the transformations are area oriented pixel dependent transformations.

17. A method according to claim 12, wherein the transformations are carried out as a result of camera movements.

* * * * *